United States Patent [19]

Osborn

[11] 4,199,127
[45] Apr. 22, 1980

[54] SECURITY NUT AND HOOK ASSEMBLY

[76] Inventor: Richard D. Osborn, 121 Nob Hill, Ashland, Oreg. 97520

[21] Appl. No.: 882,277

[22] Filed: Feb. 28, 1978

[51] Int. Cl.² .............................................. F16M 13/00
[52] U.S. Cl. ...................................... 248/552; 248/507
[58] Field of Search ..................... 248/203, 226.1, 230, 248/500, 507; 211/4, 5, 8, 9; 224/42.1 R, 42.1 F, 42.1 G

[56]  References Cited

U.S. PATENT DOCUMENTS

| | | | |
|---|---|---|---|
| 2,553,333 | 5/1951 | Schlachter | 248/203 X |
| 3,220,624 | 11/1965 | Hodak | 224/42.1 F |
| 3,273,768 | 9/1966 | Duer | 224/42.1 F |
| 3,672,612 | 6/1972 | Laing | 224/42.1 F X |
| 3,902,931 | 9/1975 | Danciger | 248/230 |
| 3,918,599 | 11/1975 | Porter | 248/203 X |
| 4,013,203 | 3/1977 | McCauley | 211/8 X |

*Primary Examiner*—William H. Schultz
*Attorney, Agent, or Firm*—Clarence A. O'Brien; Harvey B. Jacobson

[57] ABSTRACT

A security nut and hook assembly compatible with pipe-type car top carriers in order to prevent inadvertent and unauthorized removal of a payload from such a carrier includes a hook-forming element arranged for engaging a rail of the car top carrier. A clamp engages with the hook-forming member for securing a payload to the rail of the carrier, with a retainer attachable to the hook-forming member and the clamp for biasing the clamp against the rail of the carrier while simultaneously retaining the entire assembly on the carrier rail.

4 Claims, 3 Drawing Figures

SECURITY NUT AND HOOK ASSEMBLY

BACKGROUND OF THE INVENTION

1. Field of the Invention

This invention relates generally to a security nut and hook assembly, and particularly to such an assembly suited for use with pipe-type car top carriers, and the like, to assure proper securing of a payload to such a carrier.

2. Description of the Prior Art

A problem frequently arises with the use of the conventional car top carriers in that the payload cannot be adequately secured to the carrier, and even when suitably secured against inadvertent removal while driving, and the like, the payload can be easily removed by unauthorized parties. Accordingly, there is a need for a clamping arrangement which will suitably secure a payload to such a carrier.

U.S. Pat. No. 3,239,115, issued Mar. 8, 1966, to J. A. Bott, et al., discloses a ski rack having a support member which abuts the roof surface of a vehicle and is biased in place by a fastening strap, with the whole assembly being retained in place by a padlock, and the like. U.S. Pat. Nos. 2,479,300, issued Aug. 16, 1949; 2,833,453, issued May 6, 1958; and 3,476,162, issued Nov. 4, 1969, disclose additional examples of carrier tie down devices.

SUMMARY OF THE INVENTION

It is an object of the present invention to provide a security nut and hook assembly suitable for use with any pipe-type car top carrier in order to assure a secure tie down of a payload being carried on the carrier.

It is another object of the present invention to provide a security nut and hook assembly which can be adapted to various designs and applications of car top carriers, and the like.

These and other objects are achieved according to the present invention by providing a security nut and hook assembly having: a hook-forming member arranged for engaging a rail of a car top carrier, and the like; a clamp arranged for securing a payload to the associated rail of the carrier; and a retainer attachable to the hook-forming member and to the clamp for biasing the member and clamp against the rail of the carrier and retaining the assembly on the carrier while simultaneously preventing separation of the clamp and hook-forming member from one another.

The hook-forming element advantageously includes a member in the shape of a "C" having a pair of legs extending toward, but spaced from, one another. A screw threaded shank is connected to one of the legs of the member and is arranged extending from the other of the legs of the member to provide a point of attachment for the clamp and retainer. The clamp itself preferably includes a curved, longitudinally extending strap provided with a hole centrally of the longitudinal extent thereof for receiving the threaded shank of the hook-forming element, while the retainer is in the form of a nut threadedly engaging the shank of the hook-forming element in order to hold the entire assembly together.

The nut preferably is provided with a plurality of ears each diverging from the other and having a hole arranged for receiving a shackle of a padlock, and the like, which shackle also extends around the strap in order to lock the nut and strap in fixed relation relative to one another.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a fragmentary, perspective view showing a security nut and hook assembly according to the present invention arranged holding a payload on a rail of a car top carrier, and the like.

DESCRIPTION OF THE PREFERRED EMBODIMENT

Figure 1:
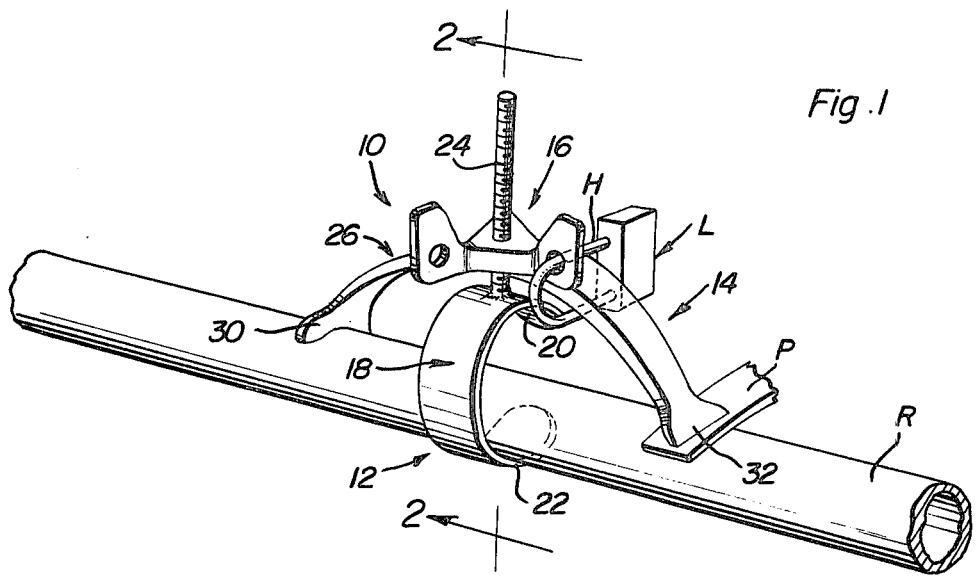
Figure 2:
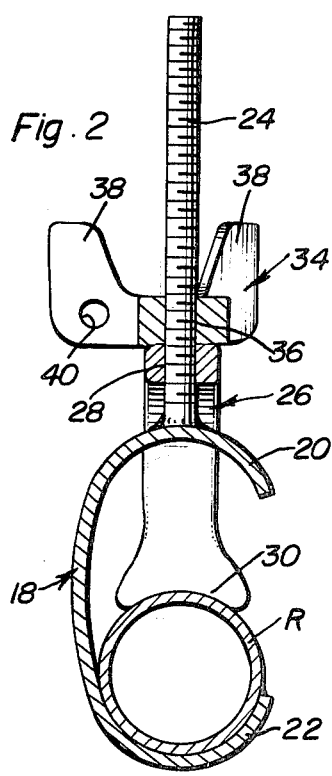
FIG. 2 is an enlarged, sectional view taken generally through the line 2—2 of FIG. 1.
Figure 3:
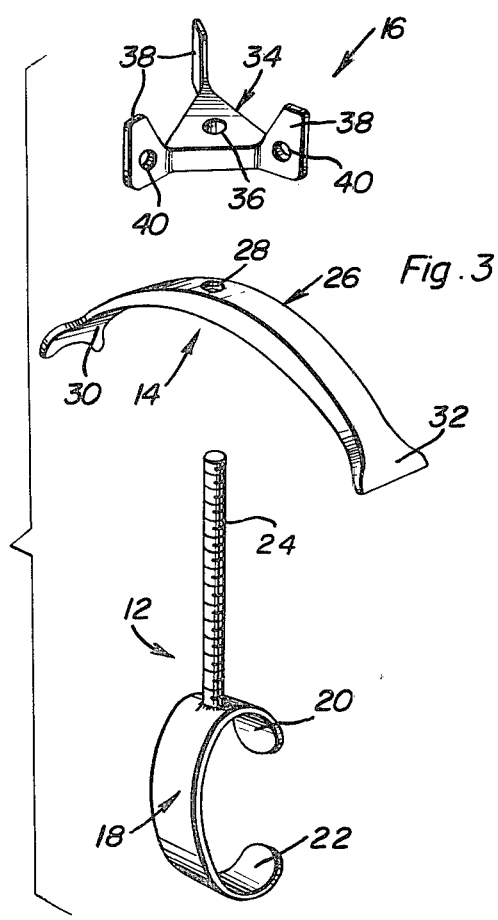
FIG. 3 is an exploded, perspective view showing a security nut and hook assembly according to the present invention.

Referring now more particularly to the figures of the drawing, a security nut and hook assembly 10 according to the present invention includes a hook-forming element 12 arranged for engaging a rail R of a car top carrier. The carrier with which an assembly 10 according to the present invention is employed can be any suitable carrier, but is preferably a pipe-type car top carrier such as conventionally manufactured. A clamp member 14 is provided for securing a payload P to rail R of the carrier, while a retainer 16 attachable to element 12 and member 14 biases element 12 and member 14 against the rail R of the carrier, and toward one another, while simultaneously retaining the entire assembly 10 on the carrier.

The hook-forming element 12 includes a member 18 substantially in the shape of a "C" having a pair of legs 20 and 22 extending inwardly toward, but spaced from, one another. A screw threaded shank 24 is connected to leg 20 and extends away from both leg 20 and leg 22.

Clamp member 14 includes a curved, longitudinally extending strap 26 provided with a hole 28 centrally of the longitudinal extent thereof, the threaded shank 24 of element 12 being arrangeable in hole 28 between the retainer 16 and the member 18 of element 12 so as to be retained thereby. This strap 26 has at the longitudinally spaced ends thereof feet 30 and 32 with foot 30 having a curved end surface forming a somewhat bifurcated configuration contoured to fittingly engage with the outer surface of a rail R, while foot 32, which can be modified or adapted to payload P to be secured, is illustrated as generally flat in nature so as to clampingly engage against a strap or other element forming the payload P to be held against rail R.

The retainer 16 includes a nut 34 having a screw threaded bore 36 which threadingly engages with the threaded shank 24 of element 12 in order to hold the entire assembly 10 together. This nut 34 is provided with a plurality of ears 38, three such ears 38 being shown, each diverging from the other of the ears 38 and having provided therein a hole 40 arranged for receiving a shackle H of a padlock L. This shackle H is also arranged extending under the strap 26 of member 14 so as to retain the nut 34 and strap 26 in desired relationship with respect to one another, and prevent removal of nut 34 from its associated threaded shank 24.

As can be appreciated from the above description and from the drawings, the leg 22 of member 18 can be arranged beneath rail R and the strap 26 brought downwardly over the shank 24 so as to come into engagement with the upper surface of rail R. Once payload P is in proper position, the nut 34 can be threaded downwardly over the shank 24 so as to come into biasing engagement with the upper surface of strap 26 and bias member 18 and strap 26 toward one another in order to achieve a clamping engagement of element 12 and member 14 on rail R. Once an appropriate tension has been made on the element 12 and member 14 by nut 34, the shackle H of a padlock L can be inserted through one of the holes 40 provided in an ear 38 of nut 34 and extended beneath the strap 26 as seen in FIG. 1 so as to secure the assembly 10 against tampering. By this arrangement, a payload P is assured of secure and tamperproof placement on a car top carrier in a simple, yet versatile and reliable manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A security nut and hook assembly comprising, in combination:
   (a) hook-forming means for engaging a rail of a car top carrier;
   (b) clamp means for securing a payload to the rail of the carrier; and
   (c) retaining means attachable to the hook-forming means and the clamp means for biasing the hook-forming means and the clamp means toward one another against the rail of the carrier and retaining the assembly on the carrier, wherein the hook-forming means is removable from the carrier, and the hook-forming means includes, in combination:
      (1) a member in the shape of a "C" having a pair of legs extending toward, but spaced from one another; and
      (2) a screw threaded shank connected to one of the legs of the member and arranged extending from the other of the legs thereof, wherein the clamp means includes a curved, longitudinally extending strap provided with a hole centrally of the longitudinal extent of the strap, the threaded shank being arrangeable in the hole between the retaining means ad the member of the hook-forming means and the strap having two longitudinally spaced ends, one end terminating in a curved bifurcated end surface contoured to fittingly engage the rail, the second end terminating in a foot generally flat to clampingly engage against the payload.

2. A security nut and hook assembly comprising, in combination:
   (a) hook-forming means for engaging a rail of a car top carrier;
   (b) clamp means for securing a payload to the rail of the carrier; and
   (c) retaining means attachable to the hook-forming means and the clamp means for biasing the hook-forming means and the clamp means toward one another against the rail of the carrier and retaining the assembly on the carrier, wherein the hook-forming means is removable from the carrier, and the hook-forming means includes in combination:
      (1) a member in the shape of a "C" having a pair of legs extending toward, but spaced from, one another, and
      (2) a screw threaded shank connected to one of the legs of the member and arranged extending from the other of the legs thereof, wherein the retaining means includes a nut provided with a bore having internal screw threads, the nut arrangeable threadingly engaging the shank of the hook-forming means, wherein the nut is provided with at least three ears each diverging from the other of the ears and having a hole arranged for receiving a shackle of a padlock, wherein the clamp means includes a curved, longitudinally extending strap provided with a hole centrally of the longitudinal extent of the strap, the threaded shank being arrangeable in the hole between the retaining means and the member of the hook-forming means.

3. A structure as defined in claim 1, wherein the retaining means includes a nut arrangeable threadingly engaging the shank of the hook-forming means, wherein the nut is provided with a plurality of ears each diverging from the other of the ears and having a hole arranged for receiving a shackle of a padlock.

4. A structure as defined in claim 3, wherein the plurality of ears numbers at least three.

* * * * *